(12) United States Patent
Kurino et al.

(10) Patent No.: US 8,110,129 B2
(45) Date of Patent: Feb. 7, 2012

(54) METHOD FOR OBTAINING PARA-TYPE WHOLLY AROMATIC POLYAMIDE PARTICLES

(75) Inventors: Toru Kurino, Matsuyama (JP); Kosaku Asagi, Tokyo (JP)

(73) Assignee: Teijin Aramid B.V., Arnhem (NL)

( * ) Notice: Subject to any disclaimer, the term of this patent is extended or adjusted under 35 U.S.C. 154(b) by 815 days.

(21) Appl. No.: 12/086,975

(22) PCT Filed: Dec. 21, 2006

(86) PCT No.: PCT/IB2006/003740
§ 371 (c)(1),
(2), (4) Date: Sep. 11, 2008

(87) PCT Pub. No.: WO2007/074368
PCT Pub. Date: Jul. 5, 2007

(65) Prior Publication Data
US 2010/0266843 A1    Oct. 21, 2010

(30) Foreign Application Priority Data
Dec. 28, 2005   (JP) ................. 2005-378303

(51) Int. Cl.
*B29B 9/00* (2006.01)
*B29B 13/10* (2006.01)
(52) U.S. Cl. ............... 264/28; 264/5; 264/13; 264/345

(58) Field of Classification Search .......... 428/402, 428/403, 407; 264/5, 13, 28, 345
See application file for complete search history.

(56) References Cited

U.S. PATENT DOCUMENTS

| 2,347,464 | A | * | 4/1944  | Cuno ............................ 523/309 |
| 4,729,921 | A | * | 3/1988  | Tokarsky ..................... 428/326 |
| 4,884,753 | A | * | 12/1989 | Maki ................................ 241/3 |
| 5,028,372 | A | * | 7/1991  | Brierre et al. ................. 264/148 |
| 5,164,131 | A | * | 11/1992 | Chau et al. ...................... 264/28 |
| 5,523,352 | A | * | 6/1996  | Janssen ......................... 525/154 |
| 5,830,395 | A | * | 11/1998 | Vercesi et al. ................ 264/101 |

FOREIGN PATENT DOCUMENTS

| JP | A 62-32123    | 2/1987 |
| JP | A 3-152130    | 6/1991 |
| JP | A 7-234551    | 9/1995 |
| JP | A 2005-120128 | 5/2005 |
| WO | WO 2004/099476 A1 | 11/2004 |
| WO | WO 2005/059211 A1 | 6/2005 |
| WO | WO 2005/059247 A1 | 6/2005 |

* cited by examiner

*Primary Examiner* — Hoa Le
(74) *Attorney, Agent, or Firm* — Oliff & Berridge, PLC

(57) ABSTRACT

The invention pertains to a method for obtaining para-type wholly aromatic polyamide particles, comprising the steps: a) introducing an aramid polymer solution into a water-based coagulating liquid to obtain a hydrous shaped product; and b) subjecting the never-dried or partly-dried shaped product having a water content of 10 to 99% by weight to freeze-grinding. These aramid polymer particles can be used as a filler material.

8 Claims, No Drawings

METHOD FOR OBTAINING PARA-TYPE WHOLLY AROMATIC POLYAMIDE PARTICLES

The present invention relates to a method for obtaining para-type wholly aromatic polyamide particles that are useful as a filling material for precision components, such as gears etc., and are excellent in terms of abrasion resistance, slidability, heat resistance, and dimensional stability, and relates particularly to para-type wholly aromatic polyamide particles. The invention further relates to freeze-ground particles thus obtained and to a use of said particles.

Para-type wholly aromatic polyamide fibers have excellent heat resistance, high strength, a high resilience ratio, chemical resistance, etc., and are used widely in various industrial materials. Furthermore, in addition to these properties, para-type wholly aromatic polyamide particles are also excellent in terms of abrasion resistance, slidability, and lubricity, and hence, they have been used as an additive in thermoplastic resin.

The production methods of para-type wholly aromatic polyamide particles include, for example, methods of grinding a bulk polymer using a grinding mill, such as a bead mill or jet mill. For thermoplastic resin production low temperature freeze-grinding methods were disclosed in Japanese Unexamined Patent Application Publication No. H7-234551, which method by cooling the resin to −196° C. using liquid nitrogen, takes advantage of the brittleness of thermoplastic resins at low temperatures. Moreover, as disclosed in Japanese Unexamined Patent Application Publication No. H3-152130 a method of grinding an aqueous dispersion of a powder such as cellulose with a high pressure homogenizer, as well as a method of directly producing particles using emulsion polymerization and the like, have been used. Further, to obtain particles with a smaller particle size, a sorting machine is used to sort the grains to the appropriate particle sizes.

In addition, some of the above-mentioned methods have been used in the production of para-type wholly aromatic polyamide particles. However, since para-type wholly aromatic polyamides are extremely rigid, the above-mentioned mechanical grinding must be conducted several times in order to obtain fine particles for sorting. Therefore, the steps are extremely complicated and increased costs are unavoidable. In the case of para-type wholly aromatic polyamide, polymer particles may be directly produced by polymerization, or may be processed after polymerization to other shaped articles, such as floc, fibrid, fibrils, and the like.

When used as a filling material for small precision components, in terms of dispersion in a thermoplastic resin, and usability and the like, smaller sized particles are most useful, and there is a great demand to a method of efficiently producing such para-type wholly aromatic polyamide particles.

It was found that after the introduction of an aramid polymer solution into a coagulating liquid and after washing with water, the obtained amorphous hydrous shaped product without undergoing a drying step, did not show sufficient crystallization, and that the shaped product contained a large amount of water.

It is an objective of the present invention to provide a simple and efficient method of manufacturing para-type wholly aromatic polyamide particles that cannot be easily produced by conventional grinding methods, and which can lead to small particles.

To this end the present invention pertains to the finding that a shaped product obtained by introducing an aramid polymer solution into a water-based coagulating liquid, and which product is not dried or only partly dried to contain at least 10 wt. % water, can be ground to fine particles by applying a freezing-grinding step, which products cannot be produced by conventional grinding processes. It was further found that the method of the invention allows short grinding times.

According to the present invention, a simple and efficient method of manufacturing para-type wholly aromatic polyamide particles is obtained, which method is particularly suitable for obtaining small particles.

By freeze-grinding a shaped product with a high water content, which is obtained by introducing an aramid polymer solution into a coagulating liquid and omitting the drying step after washing with water, can easily be ground to fine particles. The resulting particles are particularly useful, for example, as a filling material, for precision components such as gears and the like.

The para-type wholly aromatic polyamide, i.e. the aramid polymer of the present invention, is a polymer that can be obtained by polycondensation of a mixture of monomers that is mainly composed of terephthaloyl dichloride and p-phenylenediamine. This reaction can take place in N-methylpyrrolidone, however, due to the insolubility of the polymer in N-methylpyrrolidone as polymerization progresses, the obtained polymer is generally solved in sulfuric acid, and such sulfuric acid solution is used as a dope for spinning.

In the present invention, the shape of the aramid polymer as used in the grinding step may be any shape such as fibrid, fibril, pulp, sheet-shaped particles, film-shaped particles, polymeric layered particle, or fibers, as well as short fibers obtained by cutting fibers, which is usually known as floc, and the like. The size of the shaped particle, such as the length, thickness, area, and cross-sectional shape, etc. are not restricted; although fibrids, pulp, and floc are preferred particles for use in the freeze-grinding step. A fibrid according to the present invention means a small film-shaped particle like a thin leaf as for instance described in WO 2005/059247, which is produced by a method wherein, for example, an aramid polymer solution is mixed in a system using the coagulating liquid of the aramid polymer solution and applying shearing force. The term "pulp" means small short fibers randomly fibrillated, as for instance disclosed in WO 2004/099476. The term "fibril" means a polymer which is fully fibrillated and thus predominantly contains the fibrillated part and no longer the fiber stems as in pulp as for instance described in WO 2005/059211.

In the present invention the aramid polymer shaped product used in the grinding step must be a hydrous shaped product. The product may be amorphous or crystalline. The term "amorphous" herein refers to the structure that occurs before the crystalline structure is formed by hydrogen bonding. Any portion of the shaped product that has not been crystallized can be regarded as an amorphous shaped product. Furthermore, those amorphous structures containing water are called amorphous hydrous shaped products. A hydrous shaped product is generally obtained as such or after washing the coagulated product with water. The product of the invention prior to grinding is not dried or is only partially dried. When partially dried the water content should be at least 10 wt. %. If the water content of the hydrous shaped product is maintained within 10 to 99% by weight, preferably between 10 and 95% by weight, those particles that have been randomly fibrillated by applying mechanical shearing forces on said particle using a known refiner or beater or the like, may also be used in the freeze-grinding process.

The water content should be 10 to 99% by weight, preferably 20% to 95% by weight. Below 10%, even if the structure contains water, the grinding process is so inefficient that the desired fine particles cannot be obtained. Furthermore, above 99%, fine particles may be produced; however the amount of shaped product is so small that productivity is significantly lowered.

Although not clarified, some reasons behind the effect of water may be considered. In general, the crystallinity of these materials is so low that it contains a lot of inter- and intracrystalline water, which promotes the breaking up in small particles. The high amount of inter/intracrystalline water is due to the fact that it has not been completely dried as this always results in growth (sintering) of the crystallites resulting in much lower water contents. Furthermore, after freezing the water contained in the gaps between the crystals in the polymer, grinding progresses from sites where water is contained. It was further found that polymer that was fully dried and then wetted again to contain 10 to 99 wt. % water, preferably between 10 and 95% by weight, cannot be freeze-ground to small particles. It is thus necessary that never-dried polymer or only partly dried polymer to a water content of at least 10 wt. %, preferably at least 20 wt. %, is used.

In the present invention, the method of freezing the water contained in the polymer to be ground is not particularly restricted; however, considering the working properties or the cost perspective, although freezing is possible using either dry-ice or liquid nitrogen, the use of liquid nitrogen is preferred.

Furthermore, the device to be used for freeze-grinding the shaped product is not particularly restricted, and any generally known freeze-grinding apparatus may be employed. Moreover, the conditions of the grinding process are not particularly restricted, and the appropriate adjustments may be made depending on the desired particle size or shape.

Next, the steps for manufacturing the particles of the present invention are described in detail.

First, an aramid polymer solution is prepared. For this aramid polymer solution, an aramid polymer solution polymerized in a solvent may be used as such, or a solution solved in a solvent in which the aramid polymer (from hereon abbreviated as polymer) is soluble after separating the resulting aramid polymer. For example, in the case of poly-p-phenyleneterephthalamide, terephthaloyl dichloride and p-phenylenediamine are polycondensed in N-methylpyrrolidone. The N-methylpyrrolidone solution of the polymer may be used as such, or alternatively, a polymer solution in sulfuric acid may be used. Due to the poor solubility of the polymer in N-methylpyrrolidone as polymerization progresses, polymers may be separated and may be dissolved in sulfuric acid.

In this case, the concentration or the viscosity of the polymer solution is not particularly restricted; however in order to achieve the desired working properties or handling properties of the resulting polymer solution, some degree of restriction may be necessary for practical reasons.

Next, the polymer solution is introduced into a water-based coagulating liquid (from hereon abbreviated as coagulating liquid). The technique for introducing the solution is not particularly restricted, however, known methods such spinning into a system using coagulating liquid under shearing force, methods of extrusion into the coagulating liquid through a nozzle, methods of spinning the polymer solution into the coagulating liquid through a spinneret, and methods of extrusion through a slit, etc. may be applied as usual. Furthermore, when necessary, applying shearing force on the polymer solution immediately before extrusion through the nozzle or by using an air gap before spinning the polymer solution into the coagulating liquid through the spinneret, does not cause any particular problems. Moreover, as for the coagulating liquid used in the present invention containing water or preferably having water as the main component, there are no particular restrictions on adding additives to the water.

After spinning into the coagulating liquid, washing is conducted with water, and when necessary a neutralization step is performed. Thereafter, without applying a drying step, the polymer still containing water is collected. After collection of the fiber a mechanical shearing force may be applied, if necessary, using a known refiner or beater, etc. for random fibrillation. At this time, the water content of the polymer is 10 to 99 wt. %, preferably 20 to 95 wt. %.

If freeze-grinding is not performed immediately after collection, or if for example, fibers are to be cut into short fibers after production, particular caution is required so that water does not evaporate from the polymer. It is preferred that the polymer is stored in an airtight container and placed in a humidity and temperature-controlled environment out of direct sun light.

Next, the polymer is subjected to freeze-grinding. At this time, the shape of the polymer is not particularly restricted. However, to obtain smaller particles, it is preferable if the fiber length or particle size is less than 1 mm. Those particles exceeding 1 mm may also be used without any problems; but in that case adjustments must be made to the grinding conditions, such as increasing the grinding output or increasing the rotations, etc.

Before grinding the polymer, the water contained in the polymer must be frozen. There are no particular restrictions on the methods of freezing, however, considering the working properties or cost perspective etc, freezing with liquid nitrogen is preferred.

The polymer containing frozen water is then subjected to a grinding step using a known freeze-grinding apparatus. Furthermore, apart from a freeze-grinding apparatus, also a grinding mill equipped with an apparatus capable of maintaining grinding under 0° C. may be used as appropriate. The conditions for grinding may be adjusted as appropriate, according to the functioning of the apparatus or the amount of polymer used, and according to the desired particle size or shape, etc. Although depending on the grinding conditions, using this method, particles with a broader range of particle sizes could be obtained, and in this case, a publicly known sorting apparatus may be used for sorting without any problems, and therefore, particles of the desired particle size may be obtained with less variation in particle size.

It is therefore also an object of the invention to provide para-aramid particles of a size that is smaller than can be obtained with conventional methods. Thus the invention also relates to freeze-ground para-type wholly aromatic polyamide particles having a particle size with $d_{50}$ less than 75 µm, preferably less than 50 µm, and most preferably less than 30 µm. Since the particle size distribution is symmetrical or almost symmetrical, the $d_{50}$ value corresponds nicely with the average diameter of the particles.

As described, according to the present invention, a shaped product obtained by introducing an aramid polymer solution into a water-based coagulating liquid is subjected to a freeze-grinding with a water content of 10 to 99 wt. % to efficiently obtain fine para-type wholly aromatic polyamide particles.

In the following, the present invention is described in detail based on various embodiments. However, the present invention is not particularly limited to these embodiments. The following method was employed for measurement.

1) Particle Size (µm):

Without sorting etc., the resulting particles were collected and the particle sizes were measured as such by laser diffraction using a particle size measuring apparatus (Microtrac X100, manufactured by Leeds & Northrup Co.). The value indicated for $d_{50}$ means that 50% of the particles are smaller than this value. $d_{10}$ and $d_{90}$ are defined correspondingly as that 10% and 90% of the particles, respectively, are smaller than this value.

2) Water Content (%)

The water content is calculated based on the formula below after having been measured according to JIS L1013.

$$(W0-W)/W0 \times 100$$

W0 is the weight before drying; W is the weight after drying

3) Fineness (dtex):

Measured following JIS L1013

4) Fiber Length (mm):

Measured using a fiber length measuring apparatus, "Pulp Expert" (Metso automation Co)

EXAMPLE 1

According to Example 1 of WO2004/099476, fibrids of poly-p-phenyleneterephthalamide were produced. Furthermore, the length weighted average fiber length and the water content of the resulting fibrids were 0.81 mm and 91.5 wt. %, respectively. Next, after freezing the fibrids with liquid nitrogen, freeze-grinding was conducted using a freeze-grinding machine (device name: Linrexmill LX-1, manufactured by Hosokawamicron). Without sorting, etc., the resulting particles were collected and the particle size was measured as such by laser diffraction using a particle size measuring apparatus. As a result, particles with the desired particle size ($d_{50}$) under 30 μm were obtained after one grinding step. Since the drying step was omitted after spinning into a coagulating liquid and washing the polymer with water, a large amount of water was present in the gaps between the crystals of the fibrids, and by freezing the water, the portions containing frozen water became triggering points for promoting grinding.

EXAMPLE 2

A polymer solution in which poly-p-phenyleneterephthalamide was dissolved in sulfuric acid was prepared and continuously spun using a spinning machine through an air gap of a spinneret into a coagulating liquid composed of sulfuric acid and water. Then, after having been washed with water and neutralized, the thread was wound before the drying step to obtain fibers. Moreover, the fineness of the fiber was 5830 dtex (fineness after drying: equivalent to 1680 dtex), the number of filaments was 1000, and the water content was 71.2 wt. %. Next, the filaments were cut into short fibers with a guillotine cutter such that the cut length was 1.00 mm. The water content of the resulting short fibers was 55.2 wt. %. As for the obtained short fibers, freeze-grinding was conducted using the same method and conditions as in Example 1, and the particle size was measured. Also, as a result, particles with the desired particle size under 30 μm were obtained after one grinding step, as in Example 1.

EXAMPLE 3

Without completely drying the fibrids obtained in Example 1, fibrids with a length weighted average fiber length of 0.79 mm and with a water content of 21.4 wt. % were obtained after having standing for a number of hours in an environment of 20° C. with 65% RH.

Freeze-grinding of the fibrids was conducted using the same method and conditions as in Example 1, and thereafter, the particle size was measured. As a result, particles with the desired particle size under 30 μm were obtained after one grinding, as in Example 1.

COMPARATIVE EXAMPLE 1

After completely drying the fibrids obtained in Example 1, the humidity was adjusted and fibrids with a length weighted average fiber length of 0.79 mm and with a water content of 6.6% were obtained.

Freeze-grinding of the fibrids was conducted using the same method and conditions as in Example 1, and thereafter, the particle size was measured. As a result, due to the low water content of the fibrids, the particle size turned out to be above 100 μm. This was considered to be due to the complete drying, and because the water was completely removed from the gaps in the crystals crystallization of the polymer progressed but sufficient water for the freeze-grinding triggering points was not present, and therefore freeze-grinding did not achieve fine grinding.

COMPARATIVE EXAMPLE 2

Freeze-grinding of a pulp (product name "Twaron® 1094", manufactured by Teijin Twaron, length weighted average fiber length: 0.91 mm; water content: 64.5 wt. %) wherein poly-p-phenyleneterephthalamide fibers are highly fibrillated was conducted using the same method and conditions as in Example 1, and thereafter, the particle size was measured. As a result, due to the low water content of the pulp, the particle size turned out to be above 100 μm. This was considered to be due to the fact that, after spinning the polymer solution, the filaments were obtained through washing with water, neutralization, and drying, and were further cut into short fibers which then were subjected to mechanical refining and to become highly fibrillated, yielding a pulp. Therefore, the removal of water from the gaps between crystals due to the drying step promotes crystallization of the polymer making the polymer rigid, and furthermore since crystallization is irreversible, even if a large amount of water was contained later, since there was little water in the gaps between the crystals and was only present in the pulp, freeze-grinding only achieved minimal grinding.

COMPARATIVE EXAMPLE 3

Filaments of poly-p-phenyleneterephthalamide (product name "Twaron® 1000" manufactured by Teijin Twaron, fineness: 1680 dtex. number of filaments: 1000; water content: 5.1 wt. % were cut by a guillotine cutter so as the cut length would be 1.0 mm to obtain short fibers.

Freeze-grinding of the resulting short fibers was conducted using the same method and conditions as in Example 1, and thereafter the particle size was measured. As a result, the particle size turned out to be above 100 μm, which is the same results as obtained in Comparative Example 1, which is believed to have the same reason.

The results of the measurements of the particle size obtained in the Examples are shown in Table 1.

TABLE 1

|  | Example 1 | Example 2 | Example 3 | Comparative Example 1 | Comparative Example 2 | Comparative Example 3 |
|---|---|---|---|---|---|---|
| Water content (%) | 91.5 | 55.2 | 21.4 | 6.6 | 64.5 | 5.1 |
| Drying step | No | No | No | Yes | Yes | Yes |
| $d_{10}$ (μm) | 9.1 | 12.2 | 14.2 | 70.6 | 121.0 | 199.2 |
| $d_{50}$ (μm) | 25.0 | 27.5 | 29.6 | 148.1 | 287.3 | 311.1 |
| $d_{90}$ (μm) | 65.3 | 75.7 | 90.8 | 351.9 | 462.4 | 589.7 |

Fully dried polymer which is wetted again did not give small particles after freeze-grinding (Comparative example 2)

The particles obtained in the present invention are particularly useful in high performance abrasive materials to be used for breaks, such as automotives disc breaks or drum breaks, or in filling materials for precision components, such as fiber reinforced resin gears and the like.

The invention claimed is:

1. A method for obtaining para-type wholly aromatic polyamide particles, comprising:
   a) introducing an aramid polymer solution into a water-based coagulating liquid to obtain a hydrous shaped product;
   b) prior to freeze-grinding, the hydrous shaped product is not dried or is only partially dried to obtain a never-dried or partially-dried shaped product having a water content of 10-99% by weight, and
   c) subjecting the never-dried or partly-dried shaped product to freeze-grinding.

2. The method according to claim 1, wherein the shaped product is subjected to a washing step prior to subjecting the never-dried or partly-dried shaped product to freeze-grinding.

3. The method according to claim 1, wherein the shaped product is never-dried prior to subjecting to freeze-grinding.

4. The method according to claim 3, wherein the para-type wholly aromatic polyamide is poly-p-phenyleneterephthalamide.

5. The method according to claim 1, wherein para-type wholly aromatic polyamide particles are obtained having a particle size distribution d50 less than 75 μm.

6. The method according to claim 5, wherein para-type wholly aromatic polyamide particles are obtained having a particle size distribution d50 less than 50 μm.

7. The method according to claim 5, wherein para-type wholly aromatic polyamide particles are obtained having a particle size distribution d50 less than 30 μm.

8. The method according to claim 1, wherein the shaped product is fibrid, fibril, pulp, layered particle, or floc.

* * * * *